Nov. 30, 1937.  A. B. KENDRICK  2,100,964

SURGICAL BELT

Filed Feb. 4, 1936

Inventor:
Arthur B. Kendrick
By
Attorney.

Patented Nov. 30, 1937

2,100,964

UNITED STATES PATENT OFFICE 2,100,964

SURGICAL BELT

Arthur B. Kendrick, East Orange, N. J., assignor to James R. Kendrick Co., Inc., Philadelphia, Pa., a corporation of Pennsylvania Application February 4, 1936, Serial No. 62,240

4 Claims. (Cl. 128—78)

This invention relates to improvements in surgical belts of the general character shown and described in my previous patent No. 1,974,283, dated September 18, 1934.

Such belts include two belt members, a pressure pad inwardly of adjacent end portions of the members, laces for adjustably connecting said end portions and means for connecting the ends of the member which are remote from the end portions connected by the laces.

An object of the invention is to provide one or more pairs of laces for the said end portions of the belt members and to construct and relate the several parts so that the said end portions may be advantageously drawn toward each other by drawing the laces of each pair in opposite directions to each other.

Another object is to so construct and relate the pairs of laces to the said end portions of the belt members as to preserve the relationship of the laces of the several pairs thereof to each other and to the end portions in successive operations of separating the end portions and drawing them toward each other.

Another object is to provide a pair of straps in combination with and in such relation to the aforesaid pairs of laces that the drawing of the straps in opposite directions will effect the drawing of the laces of each pair in opposite directions.

Another object is to so combine and relate one of the laces of each pair thereof to the pressure pad that the laces will be instrumental in providing an adjustable connection of the pad with the said end portions of the belt members for adjustably supporting the pad with relation to the end portions while the entire appliance is being handled by and applied to the patient or user thereof.

The invention consists of the elements and the combinations of them hereinafter described and claimed.

In the accompanying drawing, illustrating the invention,

Figure 1:
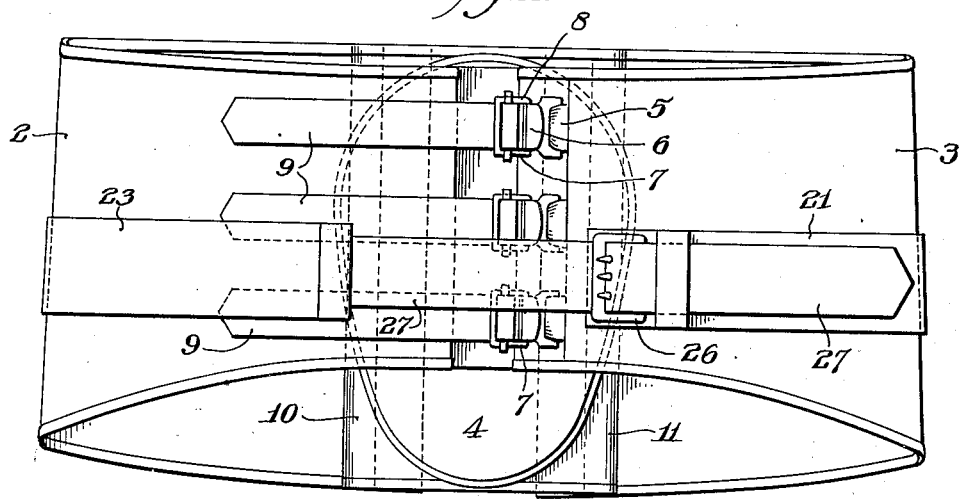
Figure 1 is a front view of a surgical belt embodying the invention.

In the form illustrated in the drawing, the invention is embodied in an appliance of the kind which is known as a sacro-iliac belt or supporter for use in the treatment of sacro-iliac conditions.

Referring now to the drawing, 2 and 3 designate two belt members, and 4 a pressure pad.

The members 2 and 3 are formed of cloth or other suitable flexible material and they are constructed to embrace the respective sides of the patient and to form, with their connections, a complete belt which is adapted to extend entirely around the patient's body.

The forward end portion of the belt member 3 is provided with short tabs 5 carrying hooks 6 which are adapted to receive the loops 7 of buckles or fastening devices 8 adjustably carried by straps 9 which are connected to and extend from the forward end portion of the belt member 2. The hooks 6 and loops 7 thus provide a suitable means for detachably connecting the forward ends of the belt members.

The pressure pad 4 is located inwardly of the rearward end portions of the belt members 2 and 3, and such end portions are connected to the pad by collapsible side parts 10 and 11, respectively. These parts 10 and 11 are formed of a continuous piece of suitable, freely foldable cloth which extends substantially from the top to the bottom of the belt members and the pad and which has its central portion secured to the central portion of the pad by suitable stitches. The lateral edge portions of this continuous piece of cloth are secured to the end portions of the belt members 2 and 3 by stitches indicated at 12, Fig. 3. The parts 10 and 11 serve to support the pad 4 by the belt members 2 and 3 while the entire appliance is being handled and being applied to the body of the wearer, and the said parts are freely collapsible between the end portions of the belt members 2 and 3 and pad 4 in a manner to permit the said end portions to lap the side portions of the pad and to be moved apart or drawn toward each other, as will be hereinafter explained.

The pressure pad 4 may be of any suitable shape and size and it may be constructed substantially like the pad shown in my said previous patent, or it may be constructed in any other suitable manner which will provide it with the requisite stiffness and flexibility for its intended purpose. The rearward surface of the pad 4 has a vertically extending strip of fabric 13 secured thereto by rectangular lines of stitches 14 between which and between the strip of fabric 13 and the body of the pad 4 are formed spaced, parallel openings 15 for a purpose presently appearing.

The rearward end portions of the belt members 2 and 3 are stiffened somewhat by transversely extending strips of cloth which are sewed to the members and which may enclose suitable stiffening stays as in the appliance of my said previous patent.

A plurality of pairs of laces 16 are provided for connecting the rearward end portions of the belt members 2 and 3 together and for drawing them toward each other, each pair comprising a lace 17 and a lace 18. The laces 17 and 18 of each pair are anchored to the rearward end of the belt member 2 by a line of stitches 19, the lace 18 being anchored to the inner side of the belt member, the lace 17 being anchored to the outer side of the belt member, and the anchoring stitches penetrating the belt member.

The two laces 17 and 18 of each pair are formed by a continuous element which extends from the stitches 19 on the outside of the belt member 2, through an aperture 20 in the member 2 to the stitches 19 on the inside of the member. The apertures 20 are formed by suitable eyelets which are set in the fabric of the belt member.

Figure 2:
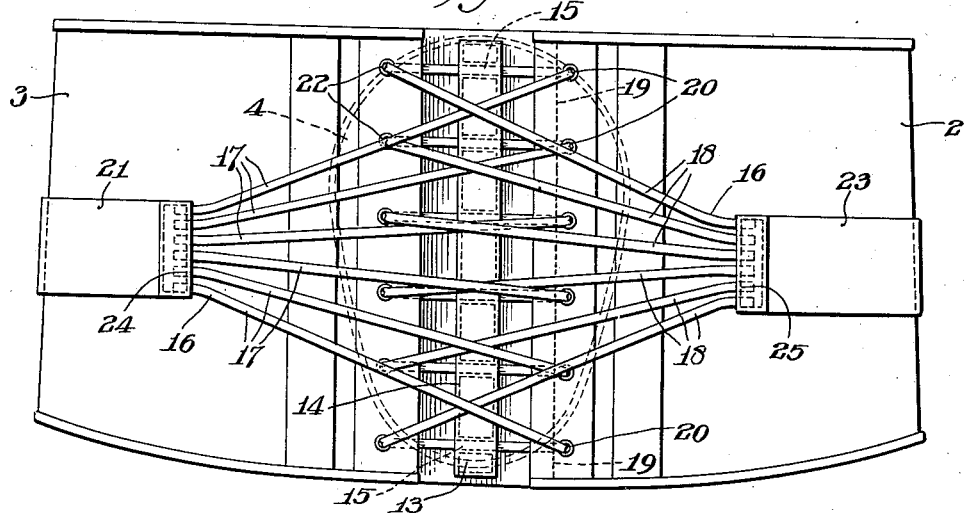
Figure 2 is a back view thereof.
Figure 3:
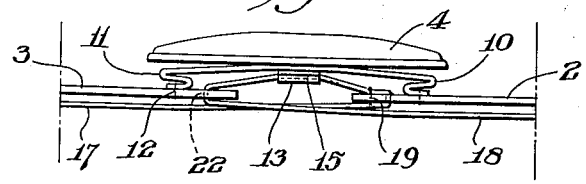
Figure 3 is a top view of the rearward portion of the belt.

The lace 17 of each pair extends from its anchoring stitches 19 across the space between the rearward end portions of the belt members 2 and 3, outwardly thereof, to the rearward end of a strap 21 which is located outwardly of the belt member 3, and the lace 18 of each pair extends from its anchoring stitches 19 through one of the pad openings 15 and across the space between the rearward end portions of the belt members 2 and 3, inwardly thereof, to and freely through an aperture 22 in the member 3 to the outside thereof, and thence back across the said space to the rearward end of a strap 23 which is located outwardly of the belt member 2, as clearly shown in Figs. 2 and 3. The apertures 22 are formed by suitable eyelets which are set in the fabric of the belt member.

The laces 17 of the several pairs are secured to the rearward end of the strap 21 by suitable stitches 24, and the laces 18 of the several pairs are secured to the rearward end of the strap 23 by suitable stitches 25.

The straps 21 and 23 extend from the laces 17 and 18, longitudinally of the belt members 3 and 2 to the front of the appliance. The forward end portion of the strap 21 is provided with a suitable buckle 26 which is adapted to engage the forward, reduced end portion 27 of the strap 23, as a means of adjustably connecting the forward ends of the straps.

It will be understood that the portions of the laces 18 extending between the anchoring stitches 19 thereof and the apertures 22 assist the collapsible side parts 10 and 11 in supporting the pad 4 by the rearward end portions of the belt members 2 and 3 to properly locate the pad with respect thereto while the entire appliance is being handled and being applied to the body of the patient or wearer.

In using the appliance, the forward ends of the belt members 2 and 3 and the forward ends of the straps 21 and 23 are separated or opened, and the appliance is placed around the body of the patient to be treated, with the pad 4 over or adjacent to the region of the sacrum where it is desired to apply the pressure. The loops 7 of the fastening devices 8 are then engaged with the hooks 6 to connect the forward ends of the belt members 2 and 3, and the buckles or devices 7 are adjusted on the straps 9 so that the entire appliance fits the patient's body in a relatively loose condition.

The straps 21 and 23 are then grasped in the right hand and left hand, respectively, of the patient, and the hands are then moved outwardly or away from each other to exert an outward pull on each of the straps. This outward pull causes the laces 17 to draw the rearward end of the belt member 2 toward the rearward end of the belt member 3, and also causes the laces 18 to slide through the pad openings 15 and the apertures 20 in the belt member 3 and thereby draw the rearward end of the member 3 toward the rearward end of the member 2. As the said ends of the members are thus drawn toward each other the parts 10 and 11 connecting the members and the pad, collapse and the members slide over the said parts and thus tighten the appliance as a whole and cause the pad 4 to exert the desired pressure upon the body of the patient. The pressure on the body produced by the pad 4 may be nicely regulated by the power which is applied to the straps 21 and 23 in drawing them apart; and, after the desired pressure has been produced, the free ends of the straps are moved toward each other around the front of the appliance and the reduced end portion 27 of the strap 23 is engaged with the buckle 26 and tightened sufficiently to connect the forward ends of the straps and preserve the desired pressure.

The anchoring of the two laces 17 and 18 of each pair to one of the belt members 2, and the relation of the lace 18 of each pair to the other belt member 3 provides a construction in which the belt members 2 and 3 are always connected by one of the laces of each pair, and in which the relationship of the laces of the several pairs to each other and to belt member 2 is preserved in successive operations of separating the rearward end portions of the belt members and in drawing them toward each other, in removing the appliance from and in applying it to the body of the patient; and such anchoring and relationship prevents the shifting of the place of connection of either lace of each pair with one of the belt members, with the result that the same operations of the two straps 21 and 23, during successive applications of the appliance to the body of the patient, will always bring the laces to the same positions relatively to the belt members.

I claim:

1. In a surgical belt the combination of two belt members having two adjacent, relatively movable, rearward end portions, a pressure pad inwardly thereof, collapsible parts connecting said end portions and the pad, means for adjustably connecting said end portions, said means including a pair of laces, and means for anchoring the laces of the pair to one of said end portions, one lace of said pair extending between the pad and said end portions and passing freely through an aperture in the end portion opposite that to which the pair of laces is anchored, the other lace of said pair extending from said anchoring means across the space between said end portions outwardly thereof, and the first named lace of said pair extending from said aperture across the space between said end portions outwardly thereof.

2. In a surgical belt the combination of two belt members having two adjacent, relatively movable, rearward end portions, a pressure pad inwardly thereof, collapsible parts connecting said end portions and the pad, each of said members having a strap associated therewith outwardly thereof on the respective sides of the space between said end portions, a plurality of pairs of laces, and means for anchoring the laces of each pair to one of said end portions, one lace of each of said pairs extending between the pad and said end portions and passing freely through an aperture in the end portion opposite that to which the pairs of laces are anchored, the other lace of each pair extending from said anchoring means across the space between said end portions and being connected to the strap on the opposite side thereof, and the first named lace of each pair extending from its aperture across the space between said end portions and being connected to the strap on the opposite side thereof.

3. In a surgical belt the combination of two belt members having two adjacent, relatively movable, rearward end portions, means for adjustably connecting said end portions, said means including a pair of laces, means for anchoring the laces of the pair to one of said end portions, one lace of said pair passing freely through an aperture in the end portion opposite that to which the pair of laces is anchored, the other lace of said pair extending from said anchoring means across the space between said end portions outwardly thereof, and the first named lace of said pair extending from said aperture across the space between said end portions outwardly thereof.

4. In a surgical belt the combination of two belt members having two adjacent, relatively movable, rearward end portions, each of said members having a strap associated therewith outwardly thereof on the respective sides of the space between said end portions, a plurality of pairs of laces, and means for anchoring the laces of each pair to one of said end portions, one lace of each pair passing freely through an aperture in the end portion opposite that to which the pairs of laces are anchored, the other lace of each pair extending from said anchoring means across the space between said end portions and being connected to the strap on the opposite side thereof, and the first named lace of each pair extending from its aperture across the space between said end portions and being connected to the strap on the opposite side thereof.

ARTHUR B. KENDRICK.